[19] United States Patent
McGuigan et al.

[11] 3,909,448
[45] Sept. 30, 1975

[54] ANTIOXIDANT COMPOSITION

[75] Inventors: Brian McGuigan, Timperley;
Richard John Dellar, Bolton;
William David Phillips, Poynton, all of England

[73] Assignee: Ciba-Geigy Corporation, Ardsley, N.Y.

[22] Filed: Oct. 10, 1972

[21] Appl. No.: 296,451

[30] Foreign Application Priority Data
Oct. 16, 1971 United Kingdom............... 48208/71

[52] U.S. Cl.......... 252/402; 252/400 R; 252/400 A; 252/405; 252/406; 260/45.7 S; 260/45.9 R; 260/814
[51] Int. Cl................................................. B01j 1/16
[58] Field of Search.... 252/402, 406, 400 R, 400 A, 252/405; 260/243 A, 569, 576, 45.7 S, 45.9 R, 45.9 C, 814, 45.8 SN

[56] References Cited
UNITED STATES PATENTS

| | | | |
|---|---|---|---|
| 3,458,509 | 7/1969 | Levine | 252/402 |
| 3,489,749 | 1/1970 | Randell | 252/405 |
| 3,523,910 | 8/1970 | Randell | 252/402 |
| 3,536,706 | 10/1970 | Randell | 252/402 |

FOREIGN PATENTS OR APPLICATIONS

| | | | |
|---|---|---|---|
| 1,224,556 | 3/1971 | United Kingdom | 252/401 |
| 1,224,653 | 3/1971 | United Kingdom | |

*Primary Examiner*—Benjamin R. Padgett
*Assistant Examiner*—Irwin Gluck
*Attorney, Agent, or Firm*—Nestor W. Shust

[57] ABSTRACT

Antioxidant compositions are prepared by oxidising a substituted phenothiazine by means of an oxidising agent.

9 Claims, No Drawings

ANTIOXIDANT COMPOSITION

This invention relates to antioxidant compositions, and is particularly concerned with the compositions obtained by oxidising certain phenothiazines, and with certain specific compounds isolated from these compositions.

According to the present invention there is provided a process for preparing an antioxidant composition which comprises oxidising phenothiazine or a substituted phenothiazine by means of an oxidising agent selected from oxygen, an alkali metal permanganate, chromic acid, an alkali metal chromate, a heavy metal tetraacetate, ferric chloride and lead dioxide.

The substituted phenothiazine may bear any number of substituents, provided that the α-position on the molecule is free, the substituents being alkyl groups containing from 3 to 12 carbon atoms, aralkyl groups or cycloalkyl groups such as 1-methyl cycloalkyl groups containing up to 7 carbon atoms. Particularly suitable compositions are obtained by oxidising 3,7-disubstituted phenothiazines or 1,3,7-trisubstituted phenothiazines.

Specific examples of alkyl substituents are the t-butyl, t-octyl, nonyl and dodecanyl groups; excellent results are obtained when the or each substituent is t-octyl. Examples of cycloalkyl substituents are 1-methyl cyclopentyl and 1-methyl cyclohexyl groups. An example of an aralkyl substituent is α, α-dimethyl benzyl.

Di and tri-substituted phenothiazines, those most preferred as starting materials for the process of this invention, are readily obtainable, or can be prepared by conventional methods.

The oxidation may be effected in different ways, thus the phenothiazine compound may be melted, and oxygen, conveniently in the form of air, may be blown into the molten mass; alternatively the phenothiazine compound may be dissolved in an inert solvent and oxygen blown into the solution. Other methods of oxidation include dissolving the phenothiazine compound in an inert solvent, and treating it with an oxidising agent such as sodium or potassium permanganate, chromic acid, sodium or potassium chromate, lead tetraacetate or ferric chloride. The preferred oxidising agent, however, is lead dioxide. We have found that such oxidising agents as hydrogen peroxide and sodium iodate do not provide a satisfactory product.

Using lead dioxide as the oxidising agent, the phenothiazine compound is dissolved in a solvent such as benzene, toluene or xylene. The oxidation is then carried out, advantageously using from 0.5 to 2 moles of lead dioxide per mole of phenothiazine compound for from 1 to 40 hours at a temperature up to 140°C., under pressure if necessary.

Antioxidant compositions according to this invention are mixtures of compounds which may be separated by various methods such as column chromatography, fractional crystallisation or solvent extraction. The main components of the mixture are a dimer and a trimer of the phenothiazine compound oxidised.

If desired, the phenothiazine may be mixed before oxidation with an aromatic secondary amine, such as phenyl α-naphthylamine, mono-t-octylphenyl-α-naphthylamine, diphenylamine, dioctyldiphenylamine or an aromatic hydrazine.

If a hydrazine is used it may have the formula:

in which A, B, C and D represent a phenyl group, a phenyl group substituted with one or more alkyl groups having 1 to 12 carbon atoms or with one or more 1-alkyl cycloalkyl or aralkyl groups such as α, α-dimethyl benzyl groups. If a diphenylamine is used it may be substituted on the phenyl radicals with one or more alkyl groups having 1 to 12 carbon atoms or with one or more 1-alkyl cycloalkyl or aralkyl groups, such as α, α-dimethylbenzyl groups. Preferably the substituent is a tertiary alkyl group having from 4 to 9 carbon atoms, especially a tertiary octyl group.

The resulting product in this case may contain compounds having both diphenylamine and phenothiazine groups in the same molecule. The product obtained by oxidising such a mixture is suitable as an antioxidant composition, or it may be heated in a non-oxidising atmosphere before being used as an antioxidant composition. Such heating may be carried out at a temperature of from 80° to 300°C. for up to 48 hours. The preferred temperature range however is from 120° to 180°C. The non-oxidising atmosphere is suitably a nitrogen atmosphere.

Examples of substrates which may be protected using antioxidants according to the invention are mineral oils, synthetic lubricants, rubber and plastics.

The antioxidants of the present invention may be used alone or in combination with other antioxidants, metal passivators, rust inhibitors, viscosity-index improvers, pour-point depressants, dispersants or detergents, extreme-pressure or anti-wear additives.

Examples of suitable antioxidants which may be used in conjunction with the antioxidants of the present invention are compounds or mixtures of compounds selected from one or more of the following groups:

i. alkylated and non-alkylated aromatic amines and mixtures thereof
ii. hindered phenols
iii. alkyl, aryl or alkaryl phosphites
iv. esters of thiopropionic acid
v. salts of di-thio carbamic or dithiophosphoric acids Suitable amine compounds under sub-heading (i) are mono, di and tri tertiary alkyl diphenylamines such as dioctyldiphenylamine, mono and di tertiary alkylated α- and β- naphthylamines, such as mono-t-octyl-α and β- naphthylamines, mono, di and tri tertiary alkyl and aralkyl phenothiazines, such as dioctyl phenothiazine and phenyl-α- and β- naphthylamine; suitable hindered phenols under sub-heading (ii) are 2,6-di-tertiary butyl-p-cresol, 4-4'-bis-(2,6-diisopropylphenol), 2,4,6-triisopropyl-phenol and 2,2'-thio-bis-(4-methyl-6-t-butylphenol); examples of phosphites under heading (iii) are triphenyl phosphite, trinonyl phosphite and diphenyldecylphosphite; a suitable ester of thiodipropionic acid is dilauryl thiodipropionate; examples of suitable salts under heading (v) are antimony diamyldithiocarbamate and zinc diamyldithiophosphate.

Examples of suitable metal passivators include those of the following types:

a. for copper; for example, benzotriazole 5,5'-methylene-bisbenzotriazole, 4,5,6,7-tetrahydrobenzotriazole, 2,5-dimercaptothiodiazole, salicylidene-propylenediamine, salts of salicylaminoguanidine.
b. for magnesium; for example pyridylamines
c. for lead; for example quinizarin, propyl gallate, sebacic acid etc.

Rust inhibitors which may be employed in the lubricant compositions include those of the following groups:
  a. Organic acids, for instance, sebacic acid and N-oleyl sarcosine and esters, metal salts and anhydrides of organic acids, for example, sorbitan mono-oleate, lead naphthenate and dodecenylsuccinic anhydride.
  b. Nitrogen containing materials, for example:
    i. primary, secondary or tertiary aliphatic or cycloaliphatic amines and amine salts of organic and inorganic acids, for example morpholine, stearyl amine and triethanolamine caprylate.
    ii. heterocyclic compounds, for example imidazolines, and oxazolines.
  c. Phosphorus containing materials, for example inorganic phosphates, phosphonic acids and amine phosphates.
  d. Sulphur containing materials, for example barium dinonylnaphthalene sulphonates.

Suitable viscosity index improvers or pourpoint depressants are, for instance, polyacrylates, polybutenes, polyvinyl pyrrolidones and polyethers.

Examples of dispersants or detergents include metal sulphonates especially calcium, barium and magnesium salts, metal phenates and polybutenyl succinimides.

Extreme pressure or antiwear additives appropriate for use in the lubricant composition include sulphur and/or phosphorus and/or halogen containing materials, for instance sulphurised oleate esters, tritolyl phosphate and chlorinated paraffins.

Other organic materials susceptible to oxidative degradation and for which the antioxidant compositions of the present invention are valuable antioxidants include, for instance, substances falling within the following groups:-
  a. materials consisting of, or based on, aliphatic or other hydrocarbons, for instance gasoline, lubricating oils, lubricating greases, mineral oils and waxes.
  b. natural and synthetic polymeric materials, for instance, natural rubber; synthetic addition polymers such as homopolymers and co-polymers of vinyl and vinylidene monomers including ethylene, propylene, styrene, butadiene, acrylonitrile, vinyl chloride, vinyl acetate; synthetic polymers derived from condensation reactions and containing ether ester, amide or urethane groupings, for instance polyester, polyamide, polyurethane, polyethylene glycols and polyarylene ether resins.
  c. non-polymeric oxygen-containing substances for instance aldehydes such as n-heptaldehyde, and unsaturated fatty acids or ester thereof for instance ricinoleic acid and methyl oleate.
  d. organo-metalloid substances such as silicone polymers, for instance polydimethylsiloxanes, polymethylphenyl-siloxanes and chlorinated derivatives thereof, silanes for instance tetra-alkyl and tetra-aryl silanes; and organo-metallic substances such as organometallic polymers.
  e. vitamins, essential oils, ketones and ethers. The invention will be illustrated by reference to the following Examples, all parts and proportions being by weight, unless otherwise stated.

EXAMPLE 1

2.1 parts of 3,7-di-t-octylphenothiazine, 1.5 parts of lead dioxide, and 10 parts benzene were stirred at room temperature for 20 hours. The lead salts were removed by filtration and the solvent was distilled under vacuum to leave a residue (2.0 parts) (hereafter to be called Antioxidant Composition A).

Separation of this residue by column chromatography on alumina (grade UG2) eluted with 80% Petroleum ether 60° – 80°/20% di-isopropyl ether gave two fractions. One fraction, after recrystallisation from ethanol gave 1.3 parts of a compound, melting point 164°–165°C., which was shown by elemental analysis, infra-red, n.m.r., and mass spectrometry, and molecular weight determination to be 1-(3',7'-di-t-octyl-10'-phenothiazinyl) 3,7-di-t-octylphenothiazine.

| Found: | C, 79.5%; H, 9.42%; N, 3.36%; S, 7.47%; Mol.wt. 850 |
|---|---|
| $C_{56}H_{80}N_2S_2$ requires: | C, 79.5%; H, 9.50%; N, 3.36%; S, 7.56%; Mol.wt. 845 |

The other fraction (0.4 parts, melting point 125°C.) was isolated from the column by washing with chloroform and was shown by thin layer chromatography, n.m.r., and mass spectrometry and elemental analysis to be a mixture largely of trimers of 3,7-di-t-octylphenothiazine. Elemental analysis: C,75.5%; H,9.2%; N,2.92%; S,6.53%

The first fraction separated in this Example is 1-(3',7'-di-t-octyl-10'-phenothiazinyl) 3,7-di-t-octylphenothiazine, a novel compound, and constitutes part of the invention. The evidence on which our statement of the structure is based is as follows:
  i. elemental analysis, molecular weight and mass spectrometry measurements indicate that the compound is a dimer of 3,7 dioctyl phenothiazine.
  ii. infra-red spectrometry indicates that an N-H bond is present in the molecule.
  iii. evidence from N.M.R. spectroscopy is that there are three aromatic protons ortho to a nitrogen atom, and that there is only one N-H proton per molecule.
  iv. treatment with Raney Nickel to remove sulphur results in 2-(4,4'-di-t-octyldiphenylamino) 4,4'-di-t-octyldiphenylamine.

Of the eight possible cross-linked dimers of 3,7 substituted phenothiazines, only 1-(3',7'-di-t-octyl-10'-phenothiazinyl) 3,7-di-t-octylphenothiazine fulfills all these conditions.

The second fraction separated in this Example is composed of trimers of 3,7 di-t-octyl phenothiazine. Such a mixture, and indeed each possible individual trimer, is novel, and constitutes a further part of the invention.

EXAMPLE 2

109 parts of 3,7-di(α,α-dimethylbenzyl) phenothiazine (prepared by the action of α-methylstyrene upon phenothiazine in the presence of 4-toluene sulphonic acid), 65.8 parts of lead dioxide, and 700 parts of toluene were stirred at room temperature for 20 hours. The lead salts were removed by filtration and the solvent was distilled under vacuum to leave a green coloured residue (107.3 parts). (Hereafter to be called Antioxidant Composition B).

The product was purified by eluting from alumina (grade UG2) with 80% petroleum spirit 60° – 80°C./20% di-isopropylether followed by recrystallisation from n-butanol to give 68% yield of 1-[3',7'-di($\alpha,\alpha$-dimethylbenzyl)10'-phenothiazinyl]-3,7-di($\alpha,\alpha$-dimethylbenzyl) phenothiazine having melting point 105–107°C. and the following chemical analysis:
Found: C, 82.94; H, 6.59; N, 2.94; S, 7.32; Mol.Wt. 868
$C_{60}H_{56}S_2N_2$ Requires: C, 82.9; H, 6.49; N, 3.22; S, 7.38% Mol.Wt. 869

The structure of the compound was confirmed by infrared spectroscopy, mass spectrometry, and nuclear magnetic resonance.

EXAMPLE 3

112.5 parts of a mixture of dinonyl phenothiazine (88.4%), mononoyl phenothiazine (11%), and phenothiazine (0.6%) prepared by the nonylation of phenothiazine in the presence of 4-toluene sulphonic acid, 65.8 parts of lead dioxide, and 250 parts of toluene were stirred at room temperature. After 16 hours the reaction mass, shown by thin layer chromatography to be free from organic starting materials, was filtered to remove lead salts and the solvent distilled under vacuum to leave a green coloured residue (110.1 parts) having a melting point 75 – 100°C. and which was shown by thin layer chromatography and mass spectrometry to contain essentially dimers and trimers of dinonyl and mononoyl phenothiazine.

EXAMPLE 4

160 parts of 1,3,7-tri-t-butyl phenothiazine (prepared as described in U.S. Pat. No. 3,523,910), 172.2 parts of lead dioxide, and 500 parts of toluene were stirred and heated to 60°C. After 72 hours thin layer chromatographical examination of the reaction mixture showed that only a trace of organic starting material was left unreacted. The reaction mixture was filtered free from lead salts and solvent distilled under vacuum to leave a black coloured residue (146.2 parts) which was shown by thin layer chromatography to be a mixture of compounds.

EXAMPLE 5

To a stirred solution of 105 parts 3,7-di-t-octyl phenothiazine in 500 parts acetone was added 10 parts of potassium permanganate and the mixture heated at 60°C. until thin layer chromatographical examination of the reaction mixture showed it to be free from 3,7-di-t-octylphenothiazine (42 hours). The reaction mixture was then filtered to remove lead salts and 45 parts of 3,7-di-t-octylphenothiazine-5-oxide, and solvent distilled under vacuum to leave 47.4 parts of green coloured residue.

The residue was eluted from alumina (grade UG2) with 80% Petroleum spirit 60° – 80°C./20% diisopropylether followed by crystallisation from ethanol to give 33% yield of 1-(3',7'-di-t-octyl-10'-phenothiazinyl)-3,7-di-t-octyl phenothiazine having a melting point of 164° – 165°C.

EXAMPLE 6

To a stirred benzene (650 parts by volume) solution of 63 parts of 3,7-di-t-octylphenothiazine and 58.5 parts of 4,4'-di-t-octyldiphenylamine at room temperature were added 78 parts of lead dioxide. After 16 hours the reaction mass, shown by thin layer chromatography to contain very little 3,7-di-t-octylphenothiazine and 4,4'-di-t-octyldiphenylamine, was filtered to remove lead salts and the solvent distilled at 40°C. under vacuum to leave a green coloured residue (120 parts) (Antioxidant C) melting point 65° – 116°C. which was shown by thin layer chromatography to contain amongst others tetra (4-t-octylphenyl) hydrazine and 1,(3,7'-di-t-octyl-10'-phenothiazinyl)-3,7-di-t-octylphenothiazine.

50 parts of Antioxidant C was stirred and heated at 180°C. for 5 hours under a flow of nitrogen. On cooling, a pale green coloured glassy solid (Antioxidant D) was obtained, having a melting point 74° – 90°C. which was shown by thin layer chromatography to contain 4,4'-di-t-octyldiphenylamine (7.5%), 2-(4,4'-di-t-octyldiphenylamino)-4,4'-di-t-octyldiphenylamine (15%), trimers of molecular formula $C_{84}H_{125}N_3$, and 1-(3,7'-di-t-octyl-10' phenothiazinyl)-3,7-di-t-octylphenothiazine. Other compounds present in substantial amounts are believed to be coupled dimers and trimers of 3,7'-di-t-octylphenothiazine and 4,4'-di-t-octyldiphenylamine.

The resistance of synthetic lubricants to oxidation may be assessed by a modified Rolls Royce 1001 Oxidation Test. This test consists of passing moist air at 15 liters/hour through 50 ml. of the test fluid (with antioxidant) at a specified temperature for a specified period of time. At the end of the test duration the fluid lost by volatilisation is replaced by adding the required amount of fresh test fluid. This is vigorously stirred into the oxidised fluid and to promote complete homogeneity the mixture is reheated to the test temperature and nitrogen is passed through for 30 minutes. At the end of this time the viscosity and acidity changes are determined.

EXAMPLES 7 – 13

Synthetic ester-based lubricant compositions were produced and subjected to the Rolls Royce oxidation test. The base fluid was a complex ester of sebacic acid, caprylic acid and trimethylolpropane in a nominal molar ratio of 1:28:10 as described and claimed in British Patent Specification No. 971,901.

To each sample of base fluid was added 2% by weight of additive, and the tests were carried out at 205°C. The duration of each test and the results are given in the table below.

The results in the table demonstrate the effectiveness of the products of the process of the present invention as lubricant antioxidants, and compares them favourably with conventional antioxidant compounds.

| Example | Additive | Time in days | Viscosity % change | Final acid value mg./KOH/g. | Weight loss % |
|---|---|---|---|---|---|
|  | 3,7-di-t-octyl-phenothiazine | 3 | 88 | 7.7 | 16 |
|  |  | 6 | 524 | 10.3 | 37 |
|  | 3,7-di(α,α-dimethyl-benzyl)-phenothiazine | 3 | 255 | 9.7 | 27 |
|  |  | 6 | polymerised |  |  |
|  | 4,4'-di-t-octyldiphenyl-amine + 3,7-di-t-octyl-phenothiazine (1% of each compound) | 6 | 67 | 7.2 | 25 |
|  | 4,4'-di-t-octyl-diphenylamine | 3 | 225 | 7.2 | 45 |
|  |  | 6 | polymerised |  |  |
| 7 | Antioxidant Composition A from Example 1 | 3 | 30 | 5.6 | 7.5 |
|  |  | 6 | 273 | 12.6 | 33 |
| 8 | 1-(3',7'-di-t-octyl-10'-phenothiazinyl)-3,7-di-t-octyl phenothiazine | 3 | 68 | 7.8 | 15 |
|  |  | 6 | 182 | 9.3 | 26 |
| 9 | Antioxidant Composition B from Example 2 | 3 | 43 | 5.2 | 13 |
|  |  | 6 | 208 | 7.3 | 33 |
| 10 | 1-[3',7'-di(α,α-dimethylbenzyl)-10'-phenothiazinyl]-3,7-di (α,α-dimethyl-benzyl) phenothiazine | 3 | 36 | 4.8 | 12 |
|  |  | 6 | 199 | 8.0 | 31 |
| 11 | Product from Example 3 | 3 | 26 | 3.5 | 10 |
|  |  | 6 | 145 | 7.2 | 29 |
| 12 | Product from Example 4 | 3 | 83 | 7.3 | 17 |
|  |  | 6 | 288 | 10.3 | 36 |
| 13 | Antioxidant Composition C from Example 6 | 3 | 7 | 0.8 | 7 |
|  |  | 6 | 22 | 2.5 | 16 |
| 14 | Antioxidant Composition D from Example 6 | 3 | 6.0 | 0.6 | 7 |
|  |  | 6 | 19 | 2.2 | 15 |

We claim:

1. An antioxidant composition obtained by a process which comprises oxidising a phenothiazine which is substituted by at least one alkyl group containing from 3 to 12 carbon atoms, at least one aralkyl group or at least one 1-alkylcycloalkyl group containing up to 7 carbon atoms, but wherein the 9-position on the molecule is free, by means of an oxidising agent selected from oxygen, a peracid, an alkali metal permanganate, chromic acid, an alkali metal chromate, a heavy metal tetracetate ferric chloride and lead dioxide.

2. An antioxidant composition obtained by a process as claimed in claim 1 in which the phenothiazine is a 3,7-disubstituted phenothiazine or a 1,3,7-trisubstituted phenothiazine.

3. An antioxidant composition obtained by a process as claimed in claim 1 in which the phenothiazine is dissolved in benzene, toluene or xylene and 0.5 to 2 moles of lead dioxide are used per mole of phenothiazine and the reaction is carried out at a temperature up to 140°C for from 1 to 40 hours.

4. An antioxidant composition obtained by a process as claimed in claim 1 in which the phenothiazine is admixed with a substituted aromatic amine or hydrazine before undergoing oxidation.

5. An antioxidant composition obtained by a process as claimed in claim 4 in which the phenothiazine is admixed with a diphenylamine substituted on the phenyl radicals with one or more alkyl groups having 1 to 12 carbon atoms or with one or more aralkyl or 1-alkyl cycloalkyl groups.

6. An antioxidant composition obtained by a process as claimed in claim 4 in which the resulting product is heated in a non-oxidising atmosphere.

7. A composition comprising an organic material susceptible to oxidative degradation and an antioxidant composition as claimed in claim 1.

8. A composition comprising an organic material susceptible to oxidative degradation and an antioxidant composition as claimed in claim 6.

9. A composition comprising a mineral oil, synthetic lubricant, rubber or plastics material and an antioxidant composition as claimed in claim 3.

* * * * *